(12) United States Patent
Wieczorek

(10) Patent No.: US 10,316,829 B2
(45) Date of Patent: Jun. 11, 2019

(54) MODULAR ACTUATOR SYSTEM EMPLOYING SHAPE MEMORY ALLOY

(71) Applicant: SMR Patents S.à.r.l., Luxembourg (LU)

(72) Inventor: Romeo Wieczorek, Esslingen (DE)

(73) Assignee: SMR Patents S.à.r.l., Luxembourg (LU)

( * ) Notice: Subject to any disclaimer, the term of this patent is extended or adjusted under 35 U.S.C. 154(b) by 143 days.

(21) Appl. No.: 15/458,880

(22) Filed: Mar. 14, 2017

(65) Prior Publication Data
US 2017/0268489 A1 Sep. 21, 2017

(30) Foreign Application Priority Data
Mar. 15, 2016 (DE) .................. 10 2016 104 775

(51) Int. Cl.
| | | |
|---|---|---|
| B60R 1/12 | (2006.01) | |
| F03G 7/06 | (2006.01) | |
| F02G 5/02 | (2006.01) | |
| F01K 11/02 | (2006.01) | |
| F01N 5/02 | (2006.01) | |

(52) U.S. Cl.
CPC .............. *F03G 7/065* (2013.01); *B60R 1/12* (2013.01); *B60R 2001/1253* (2013.01)

(58) Field of Classification Search
CPC ... F03G 7/06; F03G 7/065; B60R 1/12; B60R 2001/1253
USPC ............................ 60/527–529; 310/306, 307
See application file for complete search history.

(56) References Cited

U.S. PATENT DOCUMENTS

| | | | | |
|---|---|---|---|---|
| 3,229,177 A | * | 1/1966 | Clarke .................. | H04N 5/7425 310/307 |
| 4,092,874 A | * | 6/1978 | Stange .................... | F03G 7/065 60/527 |
| 4,544,988 A | * | 10/1985 | Hochstein .......... | H01H 61/0107 337/140 |
| 4,683,721 A | * | 8/1987 | Shin ........................ | F01B 29/10 60/527 |

(Continued)

FOREIGN PATENT DOCUMENTS

| | | |
|---|---|---|
| DE | 4209815 A1 | 9/1993 |
| DE | 102012208212 A1 | 11/2012 |

(Continued)

OTHER PUBLICATIONS

Machine Translation of DE 4209815 A1; Sep. 30, 1993.*
German Search Report dated Jan. 4, 2017, 8 pgs.

*Primary Examiner* — Mark A Laurenzi
*Assistant Examiner* — Mickey H France
(74) *Attorney, Agent, or Firm* — Jones Day

(57) ABSTRACT

The present invention relates to a modular actuator system including at least two shaft elements arranged parallel to each other and extending in a first direction, at least two blade elements mounted on each shaft element in different horizontal levels substantially perpendicular to the first direction, with all blade elements mounted on one of the shaft elements being fixedly secured thereto, whereas at least one of the blade elements mounted on another shaft element can rotate around the axis of this other shaft element, and at least three SMA wires to connect the blade elements with each other and a fixed position, with power being supplied to one of the SMA wires leading to a rotation of all blade elements.

17 Claims, 11 Drawing Sheets

(56) References Cited

U.S. PATENT DOCUMENTS

| | | | | |
|---|---|---|---|---|
| 5,396,769 | A * | 3/1995 | Brudnicki | F03G 7/065 60/527 |
| 5,726,520 | A * | 3/1998 | Grahn | A61F 2/68 310/323.02 |
| 6,140,933 | A * | 10/2000 | Bugno | B60R 1/12 33/333 |
| 6,374,608 | B1 * | 4/2002 | Corris | F03G 7/065 60/527 |
| 6,459,855 | B1 * | 10/2002 | Kosaka | G03B 9/08 396/176 |
| 7,017,345 | B2 * | 3/2006 | Von Behrens | F03G 7/065 60/527 |
| 8,436,571 | B2 * | 5/2013 | Hao | H01H 61/0107 318/127 |
| 9,394,888 | B2 * | 7/2016 | Alexander | F03G 7/065 |
| 2004/0197519 | A1 * | 10/2004 | Elzey | B32B 3/28 428/68 |
| 2004/0263028 | A1 * | 12/2004 | Pei | F02G 1/043 310/307 |
| 2005/0161312 | A1 * | 7/2005 | Agronin | H01H 3/227 200/330 |
| 2007/0193267 | A1 * | 8/2007 | He | E05B 47/0009 60/527 |
| 2008/0178526 | A1 * | 7/2008 | Browne | F24F 13/1426 49/82.1 |
| 2008/0217927 | A1 * | 9/2008 | Browne | E05B 47/0009 292/28 |
| 2009/0173305 | A1 * | 7/2009 | Alexander | F02B 27/001 123/184.53 |
| 2009/0277595 | A1 * | 11/2009 | Gao | B60J 1/2011 160/370.21 |
| 2011/0050148 | A1 * | 3/2011 | Gao | H01L 41/1132 318/646 |
| 2012/0239183 | A1 * | 9/2012 | Mankame | F03G 7/065 700/213 |
| 2013/0011806 | A1 * | 1/2013 | Gao | F03G 7/065 432/37 |
| 2013/0145760 | A1 * | 6/2013 | Gondo | F03G 7/065 60/528 |
| 2014/0210219 | A1 * | 7/2014 | Pipp | F03G 7/065 292/144 |
| 2014/0306624 | A1 * | 10/2014 | Namuduri | F03G 7/065 318/116 |
| 2015/0260170 | A1 * | 9/2015 | Alexander | F03G 7/065 318/117 |

FOREIGN PATENT DOCUMENTS

| | | | | |
|---|---|---|---|---|
| DE | 202013007862 | U1 | 1/2015 | |
| DE | 102014113065 | A1 | 3/2016 | |
| JP | 08247020 | A * | 9/1996 | |
| JP | 2000330640 | A * | 11/2000 | G03B 9/08 |
| JP | 2008138593 | A * | 6/2008 | |
| WO | WO-2004009995 | A1 * | 1/2004 | F03G 7/065 |

* cited by examiner

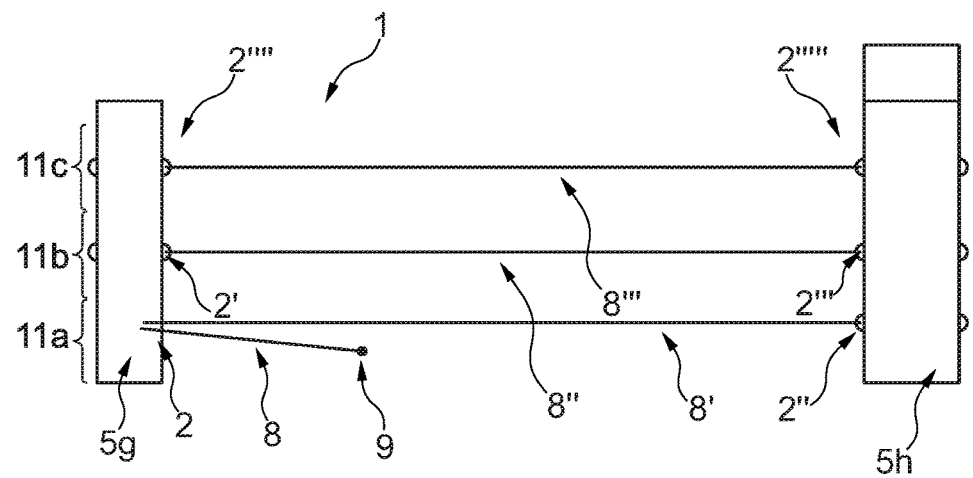
Fig. 12a
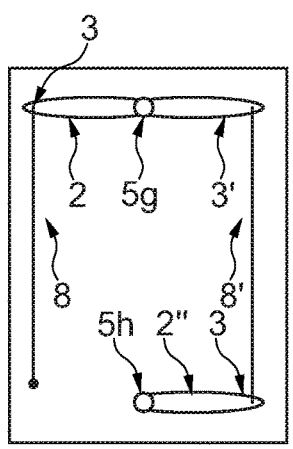 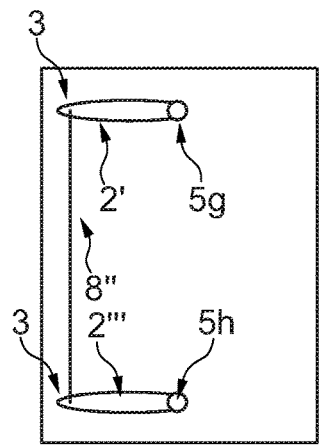 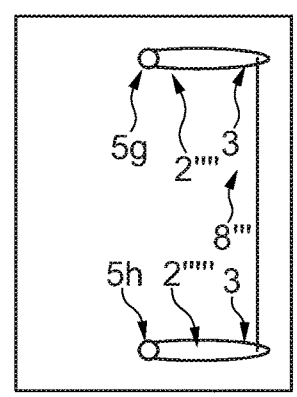
Fig. 12b Fig. 12c Fig. 12d

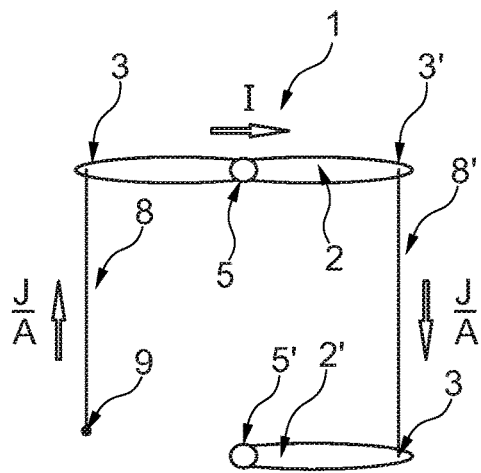
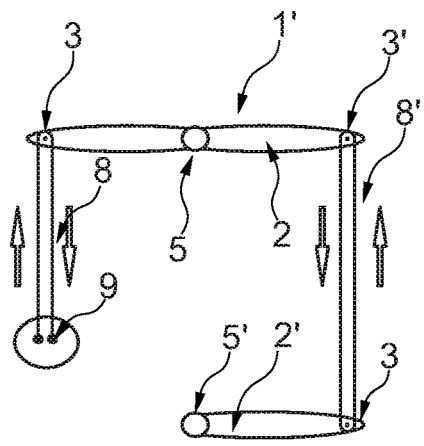
Fig. 13a  Fig. 13b
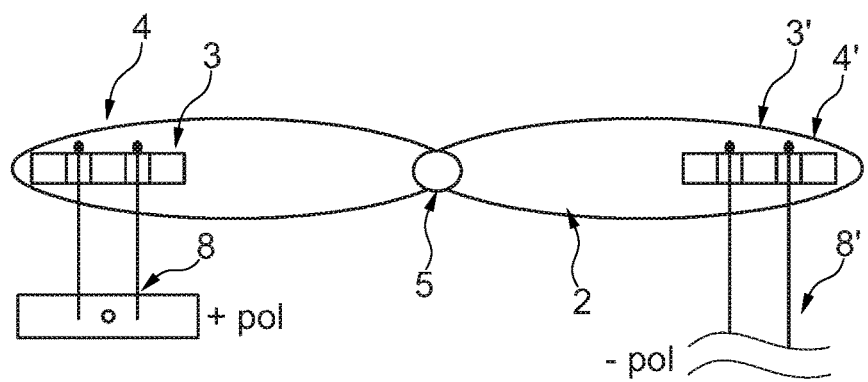
Fig. 13c

MODULAR ACTUATOR SYSTEM EMPLOYING SHAPE MEMORY ALLOY

CROSS-REFERENCE TO RELATED APPLICATIONS

This application claims the benefit of priority to German Patent Application No. DE 10 2016 104 775.9, filed Mar. 15, 2016, which is herein incorporated by reference in its entirety for all purposes.

FIELD OF THE INVENTION

The invention relates to a modular actuator system employing shape memory alloy, to a method of operating the modular actuator system and to a rear view device for a vehicle, preferably a motor vehicle, having such a modular actuator system installed.

BACKGROUND OF THE INVENTION

Actuator systems employing shape memory alloy, SMA, which can be also referred to as motors, or SMA motors find application in a variety of industries, such as in the automotive industry. For example, one common application is the application as electromechanical actuator which can rapidly and silently move. These actuator systems use the memory effect of SMA material that can be transitioned back and forth between an activated and a deactivated shape. For example, a wire comprising SMA material which is commonly referred to as SMA wire, can be made to shorten, or to extend its length by applying or removing, respectively, a heat source, or a power source that is connected to the SMA wire. In the actuator systems that are described in the prior art, at least one SMA wire is connected to mechanical elements for creating a rotational, or a linear movement to drive a component which is associated with the actuator system. For example, U.S. Pat. No. 7,017,345 B2 describes a SMA actuator assembly, where a SMA element is used to impart motion in an output shaft.

Even though some actuators that are known in the prior art are very powerful, these actuators can, however, only operate over a very limited distance. Also, powerful actuators commonly employ SMA wires that have rather large diameters which take a long time to cool down once they are deactivated, so that the SMA wires will need a long time to transition back to their original lengths.

Therefore, the invention aims at providing an improved actuator system which is powerful, allows larger actuation distances, can be tailored to the requirements of different applications in a modular form and having a compact design, so that it can be used for applications where just limited installation space is available.

SUMMARY OF THE INVENTION

The invention provides a modular actuator system, comprising: at least two shaft elements arranged parallel to each other and extending in a first direction, at least two blade elements mounted on each shaft element in different horizontal levels substantially perpendicular to the first direction, with all blade elements mounted on one of the shaft elements being fixedly secured thereto, whereas at least one of the blade elements mounted on another shaft element can rotate around the axis of this other shaft element, and at least three shape memory alloy, SMA, wires to connect the blade elements with each other and a fixed position, with power being supplied to one of the SMA wires leading to a rotation of all blade elements.

In one example, at least the second shaft element is arranged to be rotatable about its vertical axis;
the first blade element of a first type of blade elements arranged to hold at least two SMA wires and to be shaft-mounted, wherein the first blade element is rotatably mounted on the first shaft element on the first horizontal level and holds a first end section of the first SMA wire and a second end section of the second SMA wire, preferably wherein the second end section of the first SMA wire is kept at a fixed position relative to the first shaft element; the second blade element of the first type of blade elements, or of a second type of blade elements arranged to hold at least one SMA wire and to be shaft-mounted, wherein the second blade element is mounted on the first shaft element on the second horizontal level and holds a first end section of the third SMA wire; the third blade element of the second type of blade elements, or of the first type of blade elements, is non-rotatably mounted on the second shaft element on the first horizontal level and holds a second end section of the second SMA wire; the fourth blade element of the first type or second type of blade elements, wherein the fourth blade element is non-rotatably mounted on the second shaft element on the second horizontal level and holds a second end section of the third SMA wire.

The at least first and second shaft elements could have both an essentially tubular shape and could be mounted on a base plate, wherein at least the second shaft element could be mounted so that it can rotate about its vertical axis. For example, the axis could be held by means of a pin, or by any other suitable holding means on the base plate. The axes of both shaft elements could have the same height or could have different heights. The axes are essentially aligned so that at least one end of the axes is arranged in one common horizontal plane, and wherein the axes extend in the same direction.

The first type of blade elements arranged to hold at least two SMA wires and to be shaft-mounted could be, for example, a blade like, or fin like structure having an opening to be arranged around the shaft element. Alternatively, the first type of blade element could also comprise an U-shaped section, so that it can accommodate at least part of the shaft element. The first type of blade element could also comprise two attachment points for holding a SMA wire each. The two attachment points could be radially separated from each other by 180° or 270° and could be located at a certain distance spaced away from the circumference of the shaft to which it might be mounted. The distance could be in the range of 1 mm to 10 cm from the circumference of the shaft element. Also, both attachment points could be equally or not equally spaced from the shaft element.

The second type of blade elements arranged to hold at least one SMA wire and to be shaft-mounted could be essentially identically to the first type of blade elements, but could comprise only one attachment point for holding just one SMA wire. For example, the second type of blade element could have a blade like, or fin like structure and could have an opening to be arranged around the shaft element. Also, the second type of blade element could comprise an U-shaped section so that it can accommodate at least part of the shaft element. The attachment point for holding a SMA wire can be located at a certain distance spaced away from the circumference of the shaft to which it might be mounted. The distance could be in the range of 1 mm to 10 cm from the circumference of the shaft element.

The modular actuator system comprising a first blade element of a first type of blade elements that is rotatable mounted on the first shaft element on a first horizontal level and that holds a first end section of a first SMA wire and a second end section of a second SMA wire. Here, the term "first horizontal level" can be used to refer to a mounting position at the lower part of the shaft element that is close to the bottom of the modular actuator system. The term "rotatably mounted" can be used to define that the first blade element is mounted on a fixed position along the length of the first shaft element, but can be rotated relative to the first shaft element. For example, the first blade element could be mounted in or on a groove or protrusion that could run circumferentially around the shaft element. In one example, the term "rotatably mounted" can be also used to refer to a mounting position where the first blade element is mounted on a fixed position along the length of the first shaft element, but cannot rotate relative to the mounting position. In that example, a section of the shaft element where the mounting position is located on could be rotationally decoupled from the remaining shaft element so that the section and the first blade element can be made to rotate jointly with regard to the rest of the shaft element.

The first blade element holds a first end section of a first SMA wire. Preferably, a second end section of the first SMA wire is kept at a fixed position relative to the first shaft element. For example, the second end section of the first SMA wire and the first shaft element could be both mounted on the same base plate. When the first SMA wire is actuated by means of a voltage that could be applied to the SMA wire, the first SMA wire may shorten, and the first SMA wire that is attached to the first blade element may cause a rotation of the first blade element relative to the first shaft element. The voltage could be applied to the respective ends of the SMA wires. The first blade element also holds a first end section of a second SMA wire. The second end section of the second SMA wire is held by a third blade element of the first or of the second type of blade elements, and wherein the third blade element is non-rotatably mounted on the second shaft element. Here, the term "non-rotatably" can be used to define that the third blade element is mounted on a fixed position along the length of the second shaft element, but cannot rotate relative to the second shaft element. For example, the shaft element could comprise one or more driving pins along its length that could be realized by protrusions that are suited to engage with a corresponding geometry on the blade elements for non-rotatably mounting the corresponding blade elements. Also, the third blade element is mounted on the first horizontal level such as the first blade element so that the second SMA wire can run essentially horizontally between the first shaft element and the second shaft element. If a voltage is applied to the first and second SMA wires, the first SMA wire can cause a rotation of the first blade element around the first shaft which in turn causes a rotation of the third blade element together with the second shaft element to which it is non-rotatably mounted. The decrease in length of the second SMA wire increases the rotation of the third blade element and the second shaft element even further.

The fourth blade element is non-rotatably mounted on a second horizontal level on the second shaft element. Here, the term "second horizontal level" can be used to refer to a position that is located above the "first horizontal level". As described above, the fourth blade element holds a second end section of a third SMA wire, where the first end section of the third SMA wire is held by the second blade element that is arranged on the second horizontal level on the first shaft element.

In one example, the blade elements are arranged to hold the first and second end sections at predetermined distances spaced away from the first and/or second shaft elements, and preferably the first and third blade elements and the second and fourth blade elements are orientated substantially parallel to each other.

In one example, the first shaft element is arranged to be rotatable about its vertical axis, and the second-blade element is non-rotatably mounted on the first shaft element on the second horizontal level, or alternatively in another example, the first shaft element is arranged to be non-rotatable about its vertical axis, and the second-blade element is rotatably mounted on the first shaft element on the second horizontal level.

Therefore, if a voltage is applied to the first, second and third SMA wires at the same time, an actuating distance can be achieved that substantially corresponds to the sum of the three differential lengths of the first, second, and third SMA wires.

Advantageously, by using a configuration where blade elements are arranged non-rotatably and rotatably around the first and second shaft elements such as described above, a powerful system is provided that allows larger actuation distances while having a compact design.

In one example, the first shaft element is arranged to be rotatable about its horizontal axis, and the second-blade element is non-rotatably mounted on the first shaft element on the second horizontal level, and the modular actuator system further comprising: a fifth blade element of the first or second type of blade elements, wherein the fifth blade element is non-rotatably mounted on the first shaft element on a third horizontal level and holds a first end section of a fourth SMA wire; and a sixth blade element of the first or second type of blade elements, wherein the sixth blade element is rotatably mounted on the second shaft element on the third horizontal level and holds a second end section of the fourth SMA wire.

Advantageously, blade elements on a third horizontal level can be employed for increasing the efficiency of the modular actuator system.

In one example, an output element, preferably a SMA wire, is connected to a last blade element on a last horizontal level of the actuator system for establishing a linear output, and/or wherein the rotational movement of the last blade element on the last horizontal level of the actuator system is used for establishing a rotational output. For example, if a modular actuator system according to the invention is used, the last blade element could be the second blade element on the second horizontal level. For example, a SMA wire arranged in a Bowden cable could be attached to the second blade element. Also, the SMA wire could be arranged to push a pin back and forth depending on the actuation state of the actuator system.

In one example, at least one blade element of the first type of blade elements is configured to hold the at least two SMA wires spaced from each other at an angular position of 180° or 270°. The wires could be held spaced from the shaft element at a distance that could be in the range of 1 mm to 10 cm from the circumference of the shaft element. Also, the at least two SMA wires can be held opposite from each other, i.e. at 180°, or at an angle of 270° for increasing the efficiency of the actuator system.

In one example, the at least one blade element of the second type of blade element is configured to be shaft-mounted around the center of the shaft element, wherein the blade element is mounted to create a leverage of 1:1, or 1:2, or 1:3, or 1:4. For example, the at least one blade element can be mounted off-center so as to achieve different leverage ratios. Advantageously, by employing blade elements having different leverage ratios, the ratio of power and actuating distance can be varied, depending on the intended application of the actuator system.

In one example, at least one blade element of the first type of blade elements and/or of the second type of blade elements comprises conductive material. For example, the actuator system could comprise a power source itself, or could be connected to an external power source for activating the SMA wires. If, advantageously, conductive material is used in the blade elements, SMA wires that are located in one horizontal level can be connected in series through one blade element.

In one example, at least one of the SMA wires is a dual SMA wire comprising at least one SMA wire or two separate SMA wires, and the actuator system comprising at least one movably suspended cylinder attached to at least one attachment point of a blade element of the first and/or the second type, wherein the movably suspended cylinder comprises two through holes for each one of the two separate SMA wires. Advantageously, by employing a dual SMA wire, two wires having a thinner diameter can be employed, compared to the one SMA wire that would be used otherwise. Employing thin wires has the advantage that thin wires cool down in a short period of time.

In one example, (i) the single SMA wire is led through the through holes for creating the dual SMA wire, or (ii) the at least two separate SMA wires are led separately through a through hole each, wherein the ends are fitted with a stop, preferably a crimp contact, for attaching the at least two separate SMA wires, or wherein the ends are spring mounted in the through holes, preferably by means of at least one compression spring. Advantageously, by spring mounting the ends of the SMA wire, it can be ensured that the wires pull equally hard on the blade element.

In one example, the actuator system comprises at least one resilient element, preferably a spring, for transitioning the system in an initial position. For example, one or more springs can be used in various locations of the actuator system for transitioning the system back in an initial position. The term "initial position" can be used to refer to a position of the blade elements that is assumed before the SMA wires are activated.

In one example, the resilient element is configured to bias at least one rotatably mounted blade element of the first and/or the second type of blade elements, and/or wherein the resilient element is configured to bias the first SMA wire, and/or wherein the resilient element is configured to bias a linear output.

In one example, the at least one resilient element is configured to exert a biasing force after the system has reached an end position, preferably the system comprising an abutting element for determining the end position. Advantageously, the biasing force can be decoupled from the system while the system is moving in its end position so that the system can be made more powerful.

The invention also provides a rear view display device for a vehicle, preferably for a motor vehicle, comprising at least one modular actuator system according to the invention. In one example, the rear view display device further comprising at least one mirror element and/or at least one camera.

The invention also provides a method of operating a modular actuator system, comprising the steps of: rotating a first blade element of a first type of blade elements arranged to hold at least two shape memory alloy, SMA, wires and to be shaft-mounted, around a first shaft element on a first horizontal level, wherein the first blade element holds a first end section of a first SMA wire and a second end section of a second SMA wire, preferably wherein the second end section of the first SMA wire is kept at a fixed position relative to the first shaft element; rotating a second blade element of the first type of blade elements, or of a second type of blade elements arranged to hold at least one SMA wire and to be shaft-mounted, around the first shaft element on a second horizontal level, wherein the second blade element is mounted on the first shaft element on a second horizontal level and holds a first end section of a third SMA wire; rotating the second shaft element and a third blade element of the second type blade elements, or of the first of blade elements, wherein the third blade element is non-rotatably mounted on the second shaft element, wherein the third blade element holds a second end section of the second SMA wire; and rotating the second shaft element and a fourth blade element of the first type or second type of blade elements, wherein the fourth blade element is non-rotatably mounted on the second shaft element on the second horizontal level and holds a second end section of the third SMA wire.

BRIEF DESCRIPTION OF THE DRAWINGS

The following schematic drawings show aspects of the invention for improving the understanding of the invention in connection with some exemplary illustrations, wherein

FIGS. 12a, 12b, 12c, and 12d show schematic views of a modular actuator system according to an embodiment of the invention having three horizontal levels;

FIGS. 13a, 13b, and 13c show schematic views of the current path in one horizontal level of a modular actuator system according to embodiments of the invention;

DETAILED DESCRIPTION

FIGS. 1a-1e show schematic views of blade elements 2 according to embodiments of the invention, where two attachment points 3, 3' are radially separated from each other by different angles, and wherein the blade elements 2 are mountable to create different leverage effects. The blade elements 2 which are shown in FIGS. 1a-1e comprise two attachment points 3, 3' for holding one moveably suspended cylinder 4, 4' at each attachment point 3, 3'.

Figure 1A:
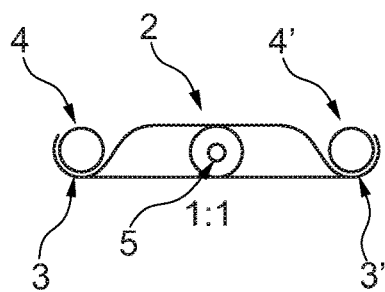
FIGS. 1a, 1b, 1c, 1d, and 1e show schematic views of blade elements of a first and a second type of blade elements according to embodiments of the invention, where two attachment points are radially separated from each other by different angles, and wherein the blade elements are mountable to create different leverage effects.

In FIG. 1a, the two attachment points 3, 3' are radially separated from each other by 180° and are located at a certain distance spaced away from the circumference of the shaft element 5 to which the blade element 2 can be mounted. The skilled person would know that the distance from the circumference of the shaft element 5 could be variable.

Figure 1B:
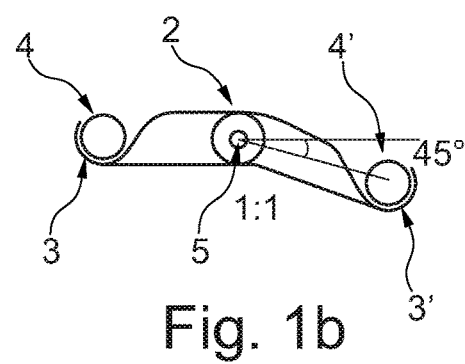

FIG. 1b shows a schematic view of a blade element 2 according to an embodiment of the invention, where the two attachment points 3, 3' are radially separated from each other by 135°. The shown blade element 2 could be the blade element 2 that is shown in FIG. 1a, but the two attachment points 3, 3' are radially separated from each other by 135°. Also, the skilled person would know that the attachment points 3, 3' could be separated from each other by any other angular position.

Figure 1C:
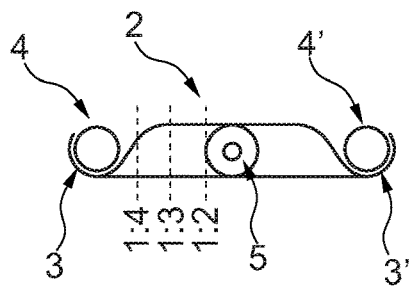

In FIG. 1c, a schematic view of a blade element 2 according to an embodiment of the invention is shown where the two attachment points 3, 3' are radially separated from each other by 180°, and where the blade element 2 is mountable to create different leverage effects. The shown blade element 2 could essentially correspond to the blade element 2 that is shown in FIG. 1a. In FIG. 1c, however, it is shown by means of marking lines that the blade element 2 could be mounted on the shaft element 5 to create different leverage effects, e.g. 1:2, or 1:3, or 1:4, by arranging the blade element 2 off-center on the shaft element 5.

Figure 1D:
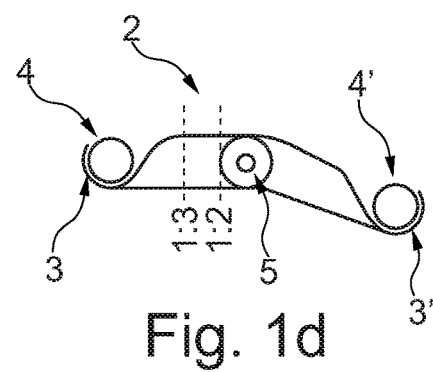

FIG. 1d shows the blade element of FIG. 1b mountable on the shaft element 5 to create different leverage effects, e.g. 1:2, or 1:3.

Figure 1E:
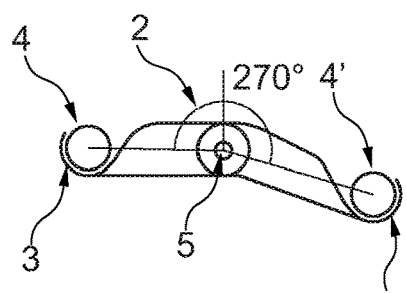

In FIG. 1e it is shown that a blade element 2 having two attachment points 3, 3' that are radially separated by 90° or 270° could be mounted on the shaft element 5 so as to achieve a leverage effect of 1:4. However, the skilled person would know that the two attachment points 3, 3' could be also mounted to achieve different leverage effects than those which are presented in the figures, and that the two attachment points 3, 3' could be radially spaced from each other by different angles, other than those which are presented in the figures.

Figure 2A:
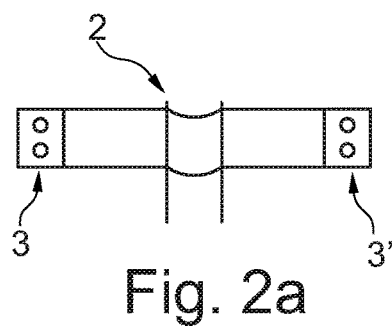
FIGS. 2a and 2b show schematic views of blade elements of a first and a second type of blade elements according to embodiments of the invention having attachment points suitable for connecting multiple SMA wires.
Figure 2B:
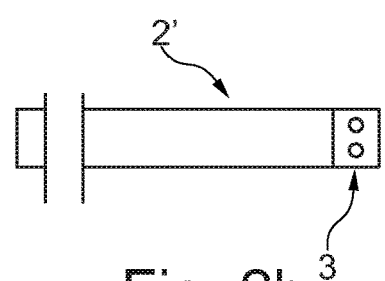

In FIGS. 2a, 2b schematic views of blade elements 2, 2' of a first and a second type of blade elements 2, 2' according to embodiments of the invention are shown. In FIG. 2a, a blade element 2 of the first type of blade elements is shown that comprises two openings on each attachment point 3, 3' for connecting two SMA wires (not shown) to the blade element 2. However, the skilled person would know that the two attachment points 3, 3' could be also configured to hold one moveably suspended cylinder 4, 4' each, wherein each moveably suspended cylinder 4, 4' can be configured to hold at least two SMA wires. In FIG. 2b, a blade element 2' of the second type of blade elements is shown, where the blade element 2' comprises just one end section with one attachment point 3. In the shown example, the attachment point 3 is suitable for connecting two SMA wires to the blade element 2. However, the skilled person would know that in the shown example the attachment point 3 could be also configured to hold one moveably suspended cylinder 4 that is configured to hold at least two SMA wires.

Figure 3:
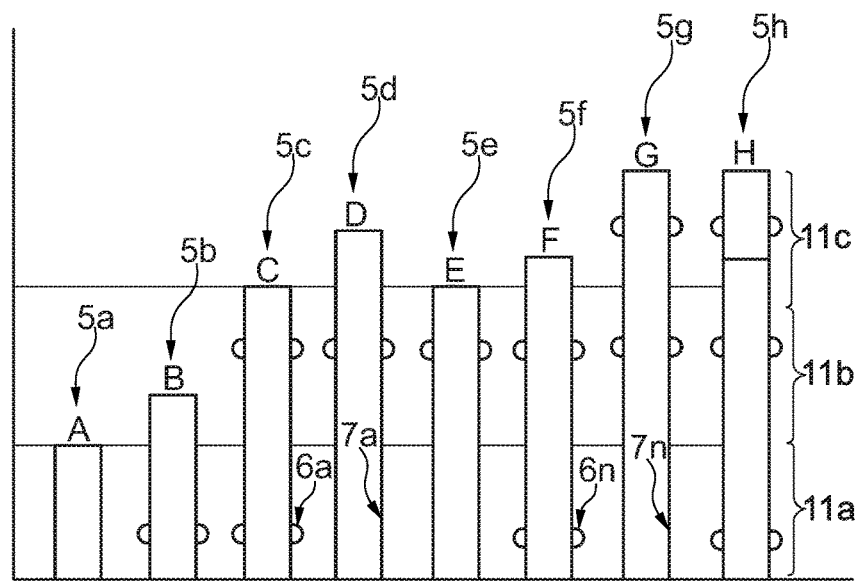
FIG. 3 shows a schematic view of shaft elements according to embodiments of the invention.

FIG. 3 shows shaft elements 5a-5h according to embodiments of the invention. Each one of the shown shaft elements 5a-5h could be modularly used as first or as second shaft elements, respectively. In FIG. 3 it is shown that the shaft elements 5a-5h can have an essentially longitudinal and cylindrical shape. Also, the shaft elements 5a-5h could have different lengths so that two or more blade elements 2 can be stacked on the shaft elements 5a-5h at different horizontal levels 11a-11c. As shown in FIG. 3, the different types shaft elements 5a-5h comprise mounting positions 6a-6n, 7a-7n along their respective lengths for one or more blade elements 2. In the shown example, two types of mounting positions 6a-6n, 7a-7n are shown. The blade element 2 that could be, for example, arranged at the first level 11a of shaft element 5d would be rotatably mounted on the shaft element 5d, i.e. so that the blade element 2 can rotate at least partially around the shaft element 5d. Also, the blade element 2 that could be arranged at the third level 11c of shaft element 5h would be rotatably mounted on the shaft element 5h. Therefore, the top part of the shaft element 5h could be rotationally decoupled from the lower part of the shaft element 5h, which is indicated by a horizontal line between the second horizontal level 11b and the third horizontal level 11c. In contrast, the blade element 2 that could be, for example, arranged on the first horizontal level 11a of shaft element 5c would be non-rotatably mounted on the shaft element 5c. In the shown example, the blade element 2 could be mounted in, or on a protrusion 6a on the shaft element 5c, so that the blade element 2 cannot freely rotate around the shaft element 5d. The various axes that are shown in the figure, can be combined to form different actuator systems 1 that comprise one to three horizontal levels 11a-11c and one to six shaft elements 2.

Figure 4A:
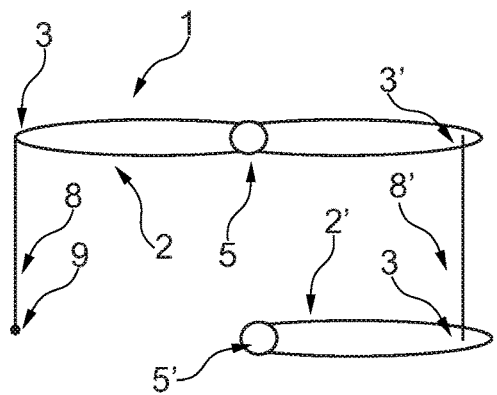
FIGS. 4a, 4b, and 4c show schematic views of modular actuator systems according to embodiments of the invention.
Figure 4B:
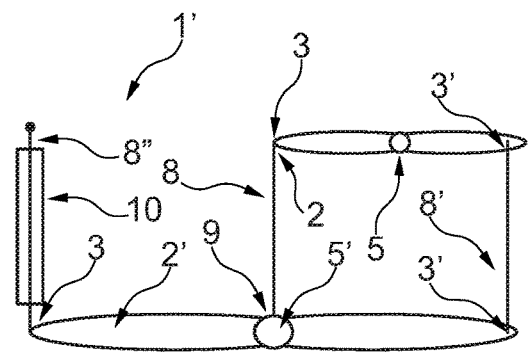
Figure 4C:
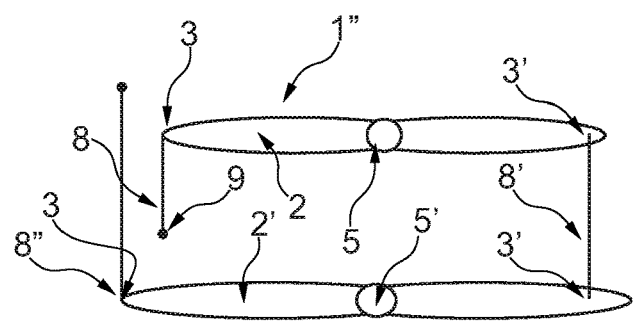

FIGS. 4a, 4b, 4c show schematic views of modular actuator systems 1, 1', 1" according to embodiments of the invention. In FIG. 4a a modular actuator system 1 is shown where the blade elements 2, 2' are arranged on a first horizontal level. In the first horizontal level, a first SMA wire 8 starts at a fixed position 9, where the first SMA wire 8 could be connected to a power supply. The opposite end of the first SMA wire 8 is then connected to an attachment point 3 on a first blade element 2. As shown in FIG. 4a, the blade element 2 is one of the first type of blade elements having two attachment points 3, 3' that are radially separated from each other by 180° and are kept at a certain distance with regard to the shaft element 5 on which the first blade element 2 is arranged. A second SMA wire 8' is connected from a second attachment point 3' of the first blade element 2 to a first attachment point 3 on the second blade element 2' of a second type of blade elements having just one attachment point 3. However, the skilled person would know that a blade element 2' of a first type of blade elements could be employed instead. Also, in the shown example, the blade elements 2, 2' can be rotatably or non-rotatably mounted on the respective shaft elements 5, 5'. FIGS. 4b and 4c show the actuator system 1 of FIG. 4a, however, having two blade elements 2, 2' of the first type of blade elements installed on the shaft elements 5, 5'. Also, FIGS. 4b and 4c show that a third SMA wire 8" can be used as linear output of the actuator system 1', 1". In FIG. 4b it is shown that the third SMA 8" wire is arranged in a Bowden cable 10. However, just one single SMA wire 8" could be used as well as linear output of the actuator system 1" as shown in FIG. 4c. Also, the skilled person would know that the blade element 2' arranged on the last horizontal level of the actuator system 1, 1', 1" could be used as rotational output, where the added length of all actuating distances essentially correspond to the rotational movement of the last blade element 2'.

Figure 5:
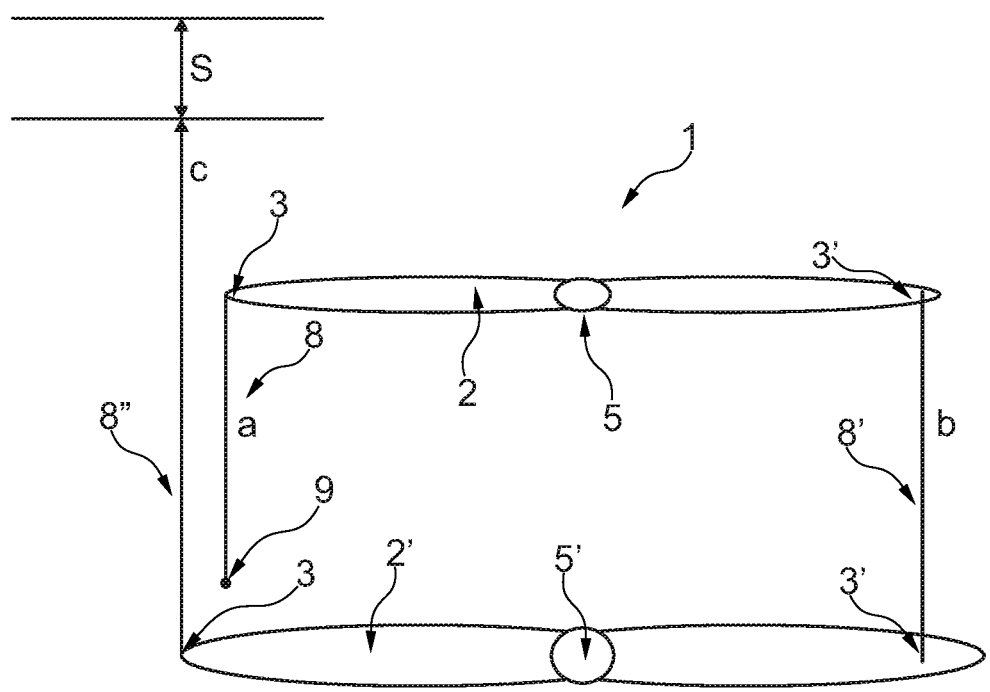
FIG. 5 shows a schematic view of a modular actuator system according to an embodiment of the invention.

FIG. 5 shows a schematic view of a modular actuator system 1 according to an embodiment of the invention. The modular actuator system 1 that is shown could be the modular actuator system 1 from FIG. 4b. The letters a, b, c and S are used in the figure to refer to the length of the respective first, second and third SMA wires 8, 8', 8". The letter S is used to refer to the actuating distance that is achievable with the system 1. As already described above, when a voltage is applied to the first, second and third SMA wires 8, 8', 8" an actuating distance S can be achieved that substantially corresponds to the sum of the three differential lengths of the first, second, and third SMA wires 8, 8', 8", so that $S \approx a*3\% + b*3\% + c*3\%$. The skilled person would know that SMA wires which are known in the prior art can be made to shorten and/or to expand by approximately 3% of their lengths so that they can withstand 50.000 to 100.000 cycles.

Figure 6A:
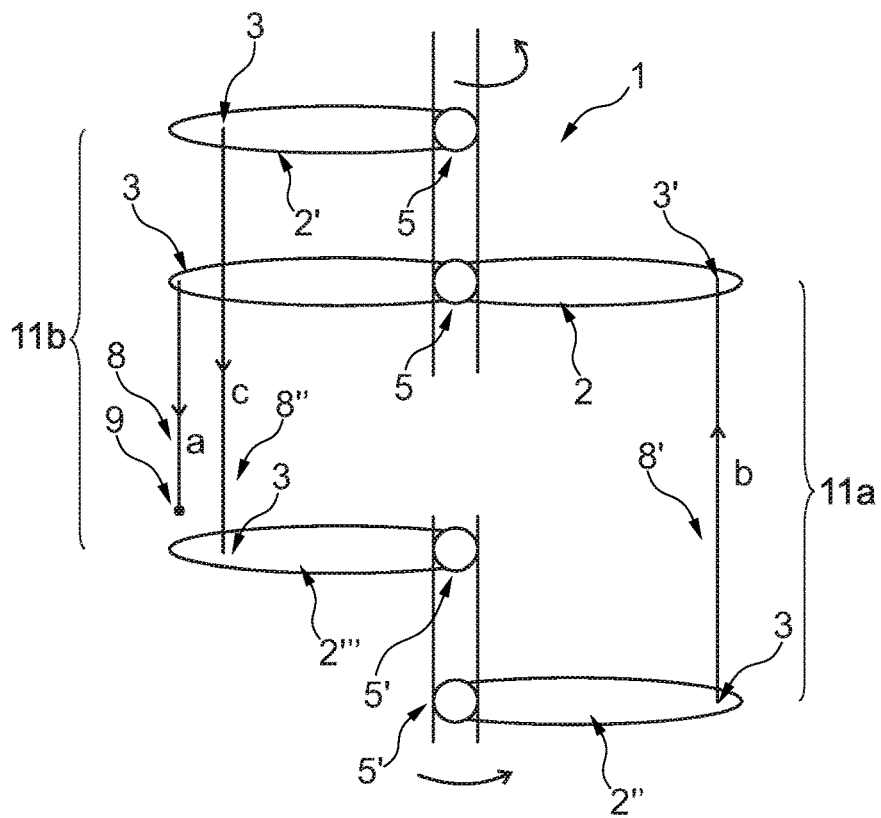
FIGS. 6a and 6b show a schematic top view and a schematic side view of a modular actuator system having two horizontal levels.
Figure 6B:
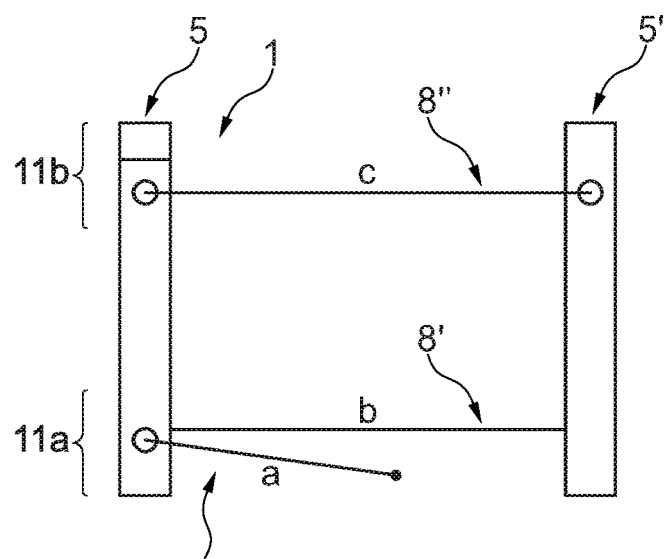

FIGS. 6a, 6b show a schematic top view and a schematic side view of a modular actuator system 1 having two horizontal levels 11a, 11b. In FIG. 6a, a top view of the modular actuator system 1 having two horizontal levels 11a, 11b is shown. Here, blade elements 2 and 2' are mounted on a first shaft element 5 and blade elements 2" and 2'" are mounted on a second shaft element 5'. In FIG. 6a the blade elements 2, 2', 2", 2'" are shown slightly offset from their respective axes 5, 5' for better visualization purposes. In FIG. 6b the system of FIG. 6a is shown from the side. The first and second shaft elements 5, 5' are arranged to be rotatable about their respective horizontal axis and are essentially horizontally aligned with each other as shown in FIGS. 6a and 6b. The figures also show that a first blade element 2 of a first type of blade elements is arranged on the first level 11a on the first shaft element 5. In the shown embodiment, the first blade element 2 is rotatably mounted on the first shaft element 5 and holds a first end section of a first SMA wire 8 and a second end section of a second SMA wire 8'. As shown in FIGS. 6a and 6b, the second end section of the first SMA 8 wire is kept at a fixed position 9 relative to the first shaft element 5. A second blade element 2' of a second type of blade elements arranged to hold at least one SMA is non-rotatably mounted on the first shaft element 5 on a second horizontal level 11b and holds a first end section of a third SMA wire 8". A third blade element 2" of the second type of blade elements is non-rotatably mounted on the second shaft element 5' on the first horizontal level 11a and holds a second end section of the second SMA wire 8'. A fourth blade element 2'" of the second type of blade elements is rotatably or non-rotatably mounted on the second shaft element 5' on the second horizontal level 11b and holds a second end section of the third SMA wire 8". By using a configuration where the blade elements 2, 2', 2", 2'" are arranged non-rotatably and rotatably around the first and second shaft elements 5, 5' such as shown and described above with reference to FIGS. 6a and 6b, a powerful system is provided that allows larger actuation distances while having a compact design.

Figure 7A:
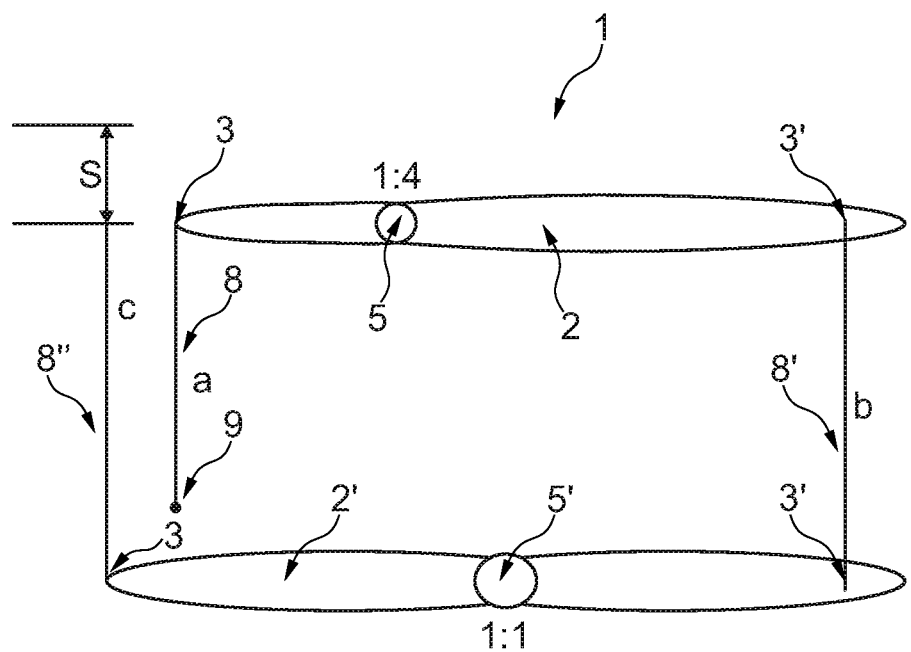
FIGS. 7a and 7b show schematic views of two modular actuator systems having a reduced actuating force and an increased actuating distance.
Figure 7B:
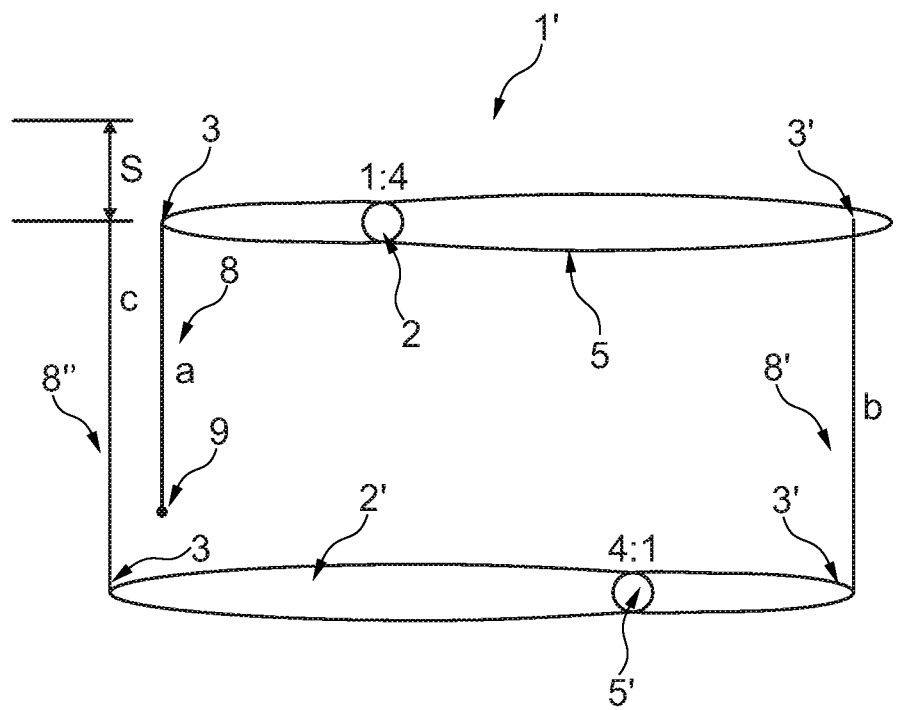

FIGS. 7a, 7b show two modular actuator systems 1, 1' having a reduced actuating force and an increased actuating distance. The actuator systems 1, 1' could be similar to the actuator system 1 that is shown in FIG. 5, but comprise SMA wires 8, 8', 8" with different diameters, and comprising blade elements 2, 2' that have different leverages. In the modular actuators system 1 that is shown in FIG. 7a, the diameters of the SMA wires 8, 8', 8" are as follows: a=2*b, and b=c. The first blade element 5 creates a leverage of 1:4, whereas the second blade element 2' creates a leverage of 1:1. Consequently, the actuating distance S that can be achieved using the system that is shown in FIG. 7a substantially corresponds to $S \approx a*3\% + 4*b*3\% + c*3\%$. The actuating distance can be further increased by using a modular actuator system 1' as shown in FIG. 7b. In the modular actuator system 1 that is shown in FIG. 7b, the diameters of the SMA wires 8, 8', 8" are as follows: a=2*b, and c=0.5*b. The first blade element 5 creates a leverage of 1:4, whereas the second blade element 2' creates a leverage of 4:1. Consequently, the actuating distance S that can be achieved by using the system that is shown in FIG. 7b substantially corresponds to $S \approx a*3\% + 4*b*3\% + c*3\%$.

Figure 8:
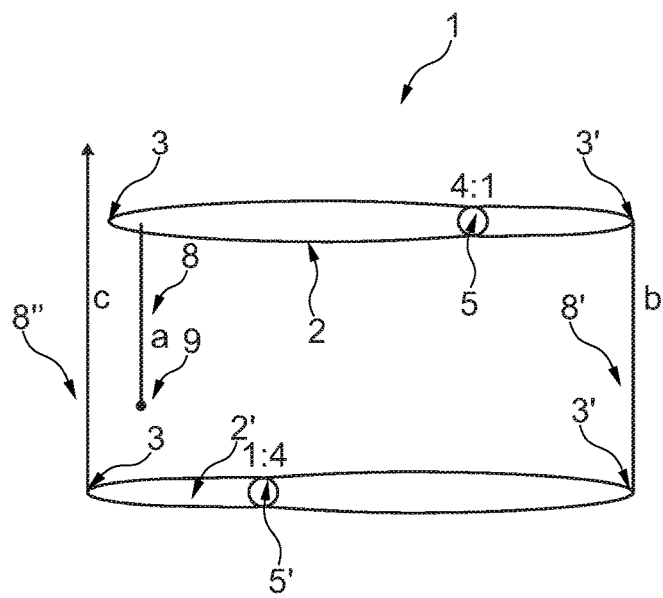
FIG. 8 shows a schematic view of a modular actuator system having an increased actuating force and a decreased actuating distance.

FIG. 8 shows a schematic view of a modular actuator system 1 having an increased actuating force and a decreased actuating distance. The actuator system 1 could be essentially similar to the actuator system 1 that is shown in FIG. 5, but comprises blade elements 2, 2' that have different leverages. In the modular actuator system 1 that is shown in FIG. 8, the diameters of the SMA wires 8, 8', 8" could be essentially all equal: a=b=c. The first blade element 2 creates a leverage of 4:1, whereas the second blade element 2' creates a leverage of 1:4. Consequently, the actuating distance S that can be achieved using the system that is shown in FIG. 8 substantially corresponds to $$S \approx \frac{a*3\%}{4} + \frac{b*3\%}{4} + c*3\%.$$

Figure 9A:
FIGS. 9a, 9b, 9c, 9d, 9e, 9f, 9g, and 9h show schematic views of moveably suspended cylinders according to embodiments of the invention.

FIGS. 9a-9e show schematic views of moveably suspended cylinders 4 according to embodiments of the invention. FIG. 9a shows a moveably suspended cylinder 4 comprising two through holes for holding at least one end of two SMA wires 8, 8'. Advantageously, by attaching two SMA wires 8, 8' to one moveably suspended cylinder 4, two SMA wires 8, 8' having a thinner diameter can be employed, i.e. compared to the one SMA wire 8 that would be used otherwise.

Figure 9B:
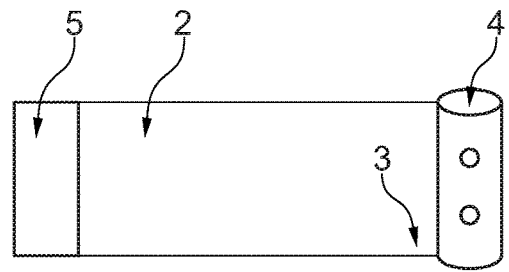
Figure 9C:
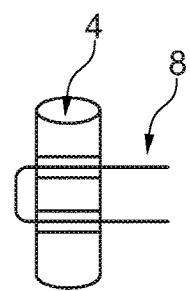
Figure 9D:
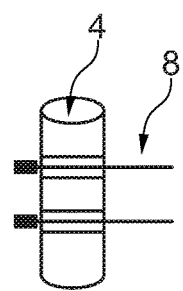
Figure 9E:
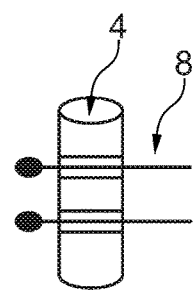
Figure 9F:
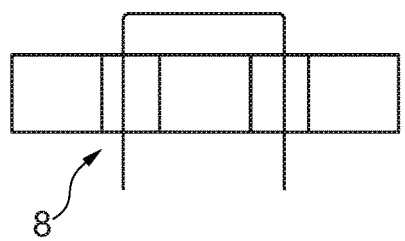
Figure 9G:
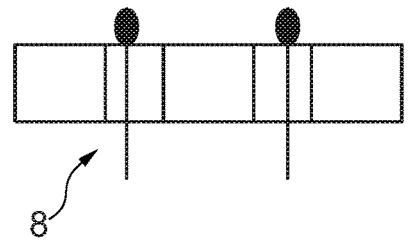
Figure 9H:
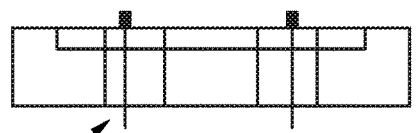

As already described above, at least one attachment point 3 of at least one blade element 2 could be configured to hold at least one moveably suspended cylinder 4 so that the moveably suspended cylinder 4 is kept rotatable at the attachment point 3. FIG. 9b shows that the moveably suspended cylinder 4 is kept at a certain distance away from the axis of the shaft element 5 to which it is mounted. FIGS. 9c-9e show various possibility of connecting a dual SMA wire 8 to a moveably suspended cylinder 4. In FIG. 9c it is shown that one SMA wire 8 could be led forwards and backwards through the through holes, FIG. 9d shows that a crimp contact could be applied to the ends of the SMA wire 8, and FIG. 9e shows that the ends of the SMW wire 8 could be spring mounted in the through holes. For example, by means of compression springs. The skilled person would know that the cylinders 4 that that are shown in FIGS. 9d and 9e could be made of conductive material so that the ends of the SMA wires 8 could be electrically connected to each other. FIGS. 9f-9h show detail views of the different ways of connecting a SMA wire 8 to a moveably suspended cylinder 4 as shown in FIGS. 9c-9e.

Also, the skilled person would know that the connection means that are shown in FIGS. 9a-9e could be also directly implemented in one attachment point 3, i.e. without employing moveably suspended cylinders 4.

Figure 10:
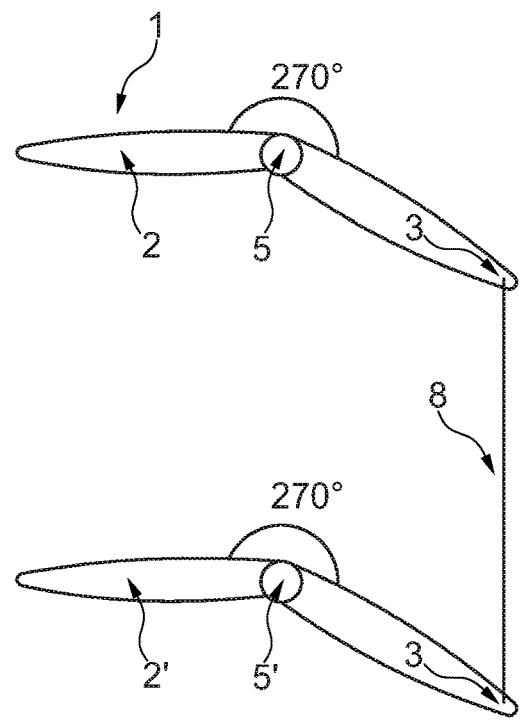
FIG. 10 shows a schematic view of a modular actuator system according to one embodiment of the invention, having blade elements of the first type of blade elements with attachment points that are spaced at an angular position of 270° from each other.

FIG. 10 shows a schematic view of a modular actuator system 1 according to one embodiment of the invention, having blade elements 2, 2' of the first type of blade elements with attachment points 3 that are spaced at an angular position of 270° from each other. The skilled person would know that by employing two blade elements 2, 2' that are shaped as described above on the same level, larger rotation angles can be achieved.

Figure 11A:
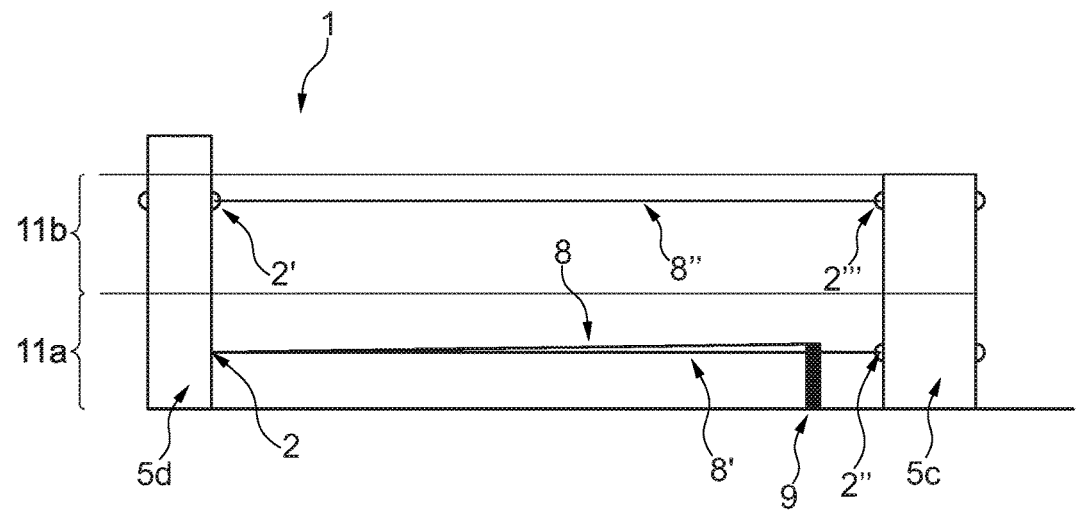
FIGS. 11a, 11b, and 11c show schematic views of a modular actuator system according to an embodiment of the invention having two horizontal levels.
Figure 11B:
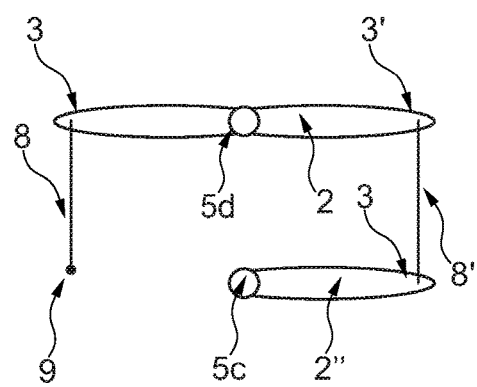
Figure 11C:
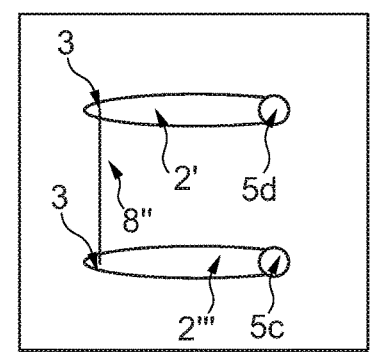

FIGS. 11a-11c show schematic views of a modular actuator system 1 according to an embodiment of the invention. FIG. 11a shows a side view of the modular actuator system 1 having two horizontal levels 11a, 11b. In the shown example, blade elements 2 and 2' are mounted on a first shaft element 5d that corresponds to shaft element 5d which is shown in FIG. 3. Further, blade elements 2" and 2''' are mounted on a second shaft element 5c that corresponds to shaft element 5c which is shown in FIG. 3.

A first blade element 2 of a first type of blade elements is arranged on the first level 11a on the first shaft element 5d. In the shown embodiment, the first blade element 2 is rotatably mounted on the first shaft element 5d and holds a first end section of a first SMA wire 8 and a second end section of a second SMA wire 8' as best shown in FIG. 11b where a top view of the first level 11a is shown. The second end section of the first SMA 8 wire is kept at a fixed position 9 relative to the first shaft element 5d. A third blade element 2" of the second type of blade elements is non-rotatably mounted on the second shaft element 5c on the first horizontal level 11a and holds a second end section of the second SMA wire 8'.

When the SMA wires 8, 8', 8" are activated, the SMA wires 8, 8', 8" will decrease their respective lengths, causing the first blade element 2 on the first level 11a to rotate around the first shaft element 5d and causing the second shaft element 5c to rotate via the third blade element 2' that is non-rotatably mounted on the second shaft element 5c. Since the fourth blade element 2''' is also non-rotatably mounted on the second shaft element 5c on a second horizontal level 11b, the fourth blade element 2''' will rotate synchronously with the third blade element 2". As best shown in FIG. 11c, where a top view of the second level 11b is shown, the second blade element 2' mounted either rotatably, or non-rotatably on the first shaft element 5d on the second horizontal level 11b holds a first end section of a third SMA wire 8", where the second end of the third SMA wire 8" is connected to the fourth blade element 2'''. When all SMA wires 8, 8', 8" are activated at the same time the differential length of the third SMA wire 8" adds to the total actuating distance S as described in the foregoing embodiments. The second blade element 2' could then be used as linear or non-linear output as described in the foregoing embodiments.

FIGS. 12a-12d show schematic views of a modular actuator system 1 according to an embodiment of the invention that comprises three horizontal levels 11a-11c. A side view of the modular actuator system 1 is shown in FIG. 12a, where FIGS. 12b to 12d are top views of the first, second and third horizontal levels 11a, 11b, 11c. In the shown example, the first shaft element 5g corresponds to shaft element 5g of FIG. 3, and the second shaft element 5h corresponds to shaft element 5h of FIG. 3.

The actuator system 1 could have the same working principle than the actuator system 1 having two horizontal levels 11a, 11b that is described above. However, by adding a third level 11c, the actuating distance can be further increased. Therefore, for building a three level actuator-system 1, the second blade element 2' is non-rotatably mounted on the first shaft element 5g, since the first-blade element 2 is rotatably mounted on the first-shaft element 5g, the shaft element 5g can be rotated via the second blade element 2', i.e. via shortening the third SMA wire 8" that is attached to the second blade element 2'. As shown in FIGS. 12a and 12d, a fifth blade element 2'''' is non-rotatably mounted on the first shaft-element 5g, so that the fifth blade element 2'''' rotates synchronously with the second blade element 2'. Also, as shown in FIGS. 12a and 12d, the fifth blade element 2'''' is connected via a fourth SMA wire 8''' to a sixth blade element 2''''' that is rotatably attached to the second shaft element 5h so that it can freely rotate around the second shaft element 5g. The sixth blade element 2''''' could then be used as linear or as non-linear output as described in the foregoing embodiments.

In FIGS. 13a-13c schematic views of the current path in one horizontal level of the modular actuator system 1, 1' according to embodiments of the invention are shown. In FIG. 13a the current path through a blade element 2 comprising conductive material is shown. For example, the actuator system 1 could comprise a power source itself, or could be connected to an external power source for activating the SMA wires 8, 8'. As shown in FIG. 13a, the SMA wires 8, 8' that are located in one horizontal level can be connected in series through one blade element 2 due to the conductive material that is used in the blade element 2. In FIG. 13b an embodiment is shown where dual SMA wires 8, 8' comprising at least one SMA wire or two separate SMA wires are employed. The dual wires 8, 8' can be connected directly to the attachment points 3, 3' of the blade elements 2, 2', or could be connected to the attachments points 3, 3' via moveably suspended cylinders 4, 4' as shown in FIGS. 9a-9h. In the embodiment that is shown in FIG. 13b, the blade element 2 does not comprise conductive material. Therefore, for activating the respective SMA wires 8, 8', a positive and a negative terminal of a power supply (not shown) is connected to the respective ends of the SMA wires 8, 8'. In FIG. 13c a detail view is given of the blade element 2 that is shown in FIG. 13b.

Figure 14:
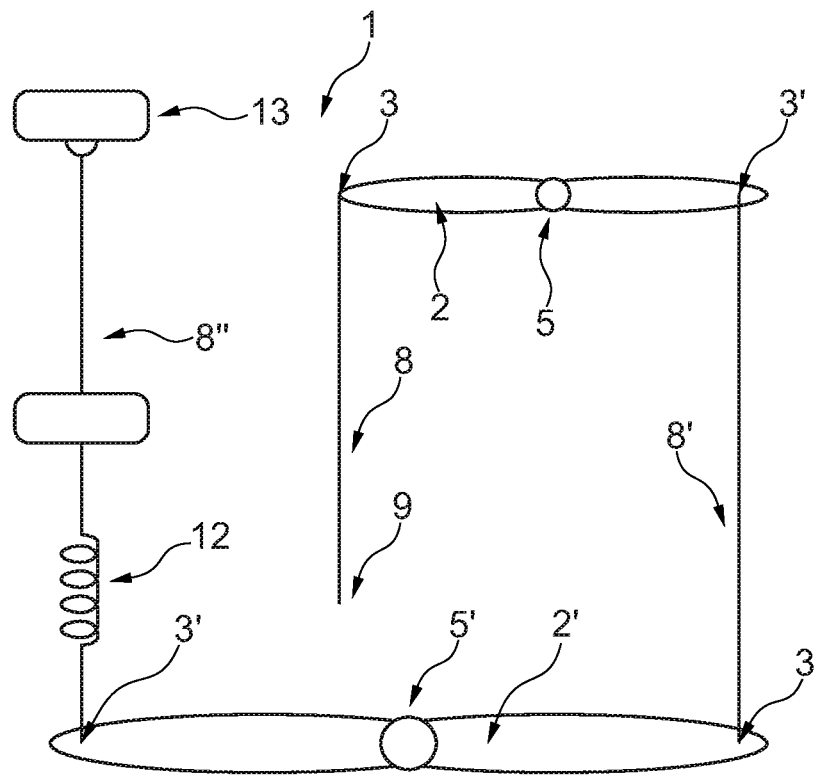
FIG. 14 shows a schematic view of an actuator system comprising at least one resilient element according to an embodiment of the invention.

FIG. 14 shows a schematic view of a modular actuator system 1 comprising at least one resilient element 12 according to embodiments of the invention. In FIG. 14, a modular actuator system 1 is shown that comprises a spring as resilient element 12 for transitioning the system back to an initial position of the actuator system 1. In the shown embodiment, the resilient element 12 biases the SMA wire 8" that is used as linear output of the actuator system 1. In the shown embodiment, the SMA wire 8" is pulled back by the force of the resilient element 12 when the modular actuator system 1 is deactivated. Also, an abutting element 13 for determining the end position of the linear output is shown in FIG. 14. By employing an abutting element 13, the biasing force can be decoupled from the actuator system 1, while the system, i.e. the linear output, is moving in its end position so that the system can be made more powerful.

Figure 15:
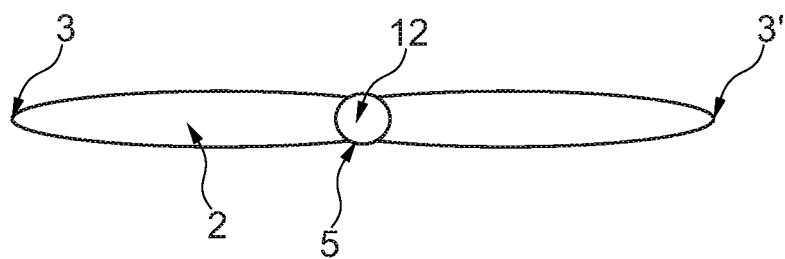
FIG. 15 shows a schematic view of a blade element comprising at least one resilient element according to an embodiment of the invention.

FIG. 15 shows an example of a blade element 2, where the resilient element 12 is located around the shaft element 5 to which the blade element 2 can be connected to. In the actuator system 1 one or more of these blade elements 2 comprising a resilient element 12 can be used for transitioning the system back to an initial position. The skilled person would also know that the above mentioned schemes for biasing the system, can be combined with each other and complemented with additional schemes for transitioning the system back to an initial position. For example, dual SMA wires 8, 8' as shown in FIG. 13b could be employed for transitioning the system back to an initial position, where each dual SMA wire 8, 8" could employ two separate SMA wires 8, 8' having opposite contraction directions.

REFERENCE SIGNS 1, 1',1" modular actuator system
2, 2'-2"" blade element
3, 3' attachment point
4, 4' moveably suspended cylinder
5, 5', 5a-h shaft element
6a-6n first type of mounting position
7a-7n second type of mounting position
8, 8'-8"", SMA wire
9 fixed position
10 Bowden cable
11a-11c first, second and third horizontal level
12 resilient element
13 abutting element
a,b,c length of the first, second and third SMA wire
S actuating distance
$F_{Actuator}$ actuating force

The invention claimed is:

1. A modular actuator system, comprising:
at least two shaft elements arranged parallel to each other and extending in a first direction;
at least two blade elements mounted on each shaft element in different horizontal levels along each of the at least two shaft elements and substantially perpendicular to the first direction, with all blade elements mounted on one of the shaft elements being fixedly secured thereto, whereas at least one of the blade elements mounted on another shaft element can rotate around the axis of this other shaft element; and
at least three shape memory alloy (SMA) wires to connect the blade elements with each other and a fixed position, with power being supplied to one of the SMA wires leading to a rotation of all blade elements.

2. The modular actuator system of claim 1, wherein:
at least the second shaft element is arranged to be rotatable about its vertical axis;
the first blade element of a first type of blade elements is arranged to hold at least two SMA wires and to be shaft-mounted, wherein the first blade element is rotatably mounted on the first shaft element on the first horizontal level and holds a first end section of the first SMA wire and a second end section of the second SMA wire, preferably wherein the second end section of the first SMA wire is kept at a fixed position relative to the first shaft element;
the second blade element of the first type of blade elements, or of a second type of blade elements is arranged to hold at least one SMA wire and to be shaft-mounted, wherein the second blade element is mounted on the first shaft element on the second horizontal level and holds a first end section of the third SMA wire;
the third blade element of the second type of blade elements, or of the first type of blade elements, is non-rotatably mounted on the second shaft element on the first horizontal level and holds a second end section of the second SMA wire;
the fourth blade element of the first type or second type of blade elements, wherein the fourth blade element is non-rotatably mounted on the second shaft element on the second horizontal level and holds a second end section of the third SMA wire.

3. The modular actuator system of claim 2, wherein:
the blade elements are arranged to hold the first and second end sections at predetermined distances spaced away from at least one of the first and second shaft elements, and preferably the first and third blade elements and the second and fourth blade elements are orientated substantially parallel to each other.

4. The modular actuator system of claim 2, wherein
the first shaft element is arranged to be rotatable about its vertical axis, and the second-blade element is non-rotatably mounted on the first shaft element on the second horizontal level, or
the first shaft element is arranged to be non-rotatable about its vertical axis, and the second-blade element is rotatably mounted on the first shaft element on the second horizontal level.

5. The modular actuator system of claim 2, wherein
the first shaft element is arranged to be rotatable about its horizontal axis, and the second-blade element is non-rotatably mounted on the first shaft element on the second horizontal level, and the modular actuator system further comprising:
a fifth blade element of the first or second type of blade elements, wherein the fifth blade element is non-rotatably mounted on the first shaft element on a third horizontal level and holds a first end section of a fourth SMA wire; and
a sixth blade element of the first or second type of blade elements, wherein the sixth blade element is rotatably mounted on the second shaft element on the third horizontal level and holds a second end section of the fourth SMA wire.

6. The modular actuator system claim 1, wherein
an output element, preferably a SMA wire, is connected to a last blade element on a last horizontal level of the actuator system for establishing a linear output, and/or wherein the rotational movement of the last blade element on the last horizontal level of the actuator system is used for establishing a rotational output.

7. The modular actuator system of claim 1, wherein at least one blade element of the first type of blade elements is configured to hold the at least two SMA wires spaced from each other at an angular position of 180° or 270°.

8. The modular actuator system of claim 1, wherein at least one blade element of the first type of blade elements is configured to be shaft-mounted to create a leverage effect of: 1:1, or 1:2, or 1:3, or 1:4.

9. The modular actuator system of claim 1, wherein at least one blade element of at least one of the first type of blade elements and the second type of blade elements comprises conductive material.

10. The modular actuator system of claim 1, wherein at least one of the SMA wires is a dual SMA wire comprising at least one single SMA wire, or two separate SMA wires, and the actuator system comprising:
- at least one moveably suspended cylinder attached to at least one attachment point of a blade element of at least one of the first and the second type of blade elements, wherein the at least one movably suspended cylinder comprises at least two through holes for each one of the two separate SMA wires.

11. The modular actuator system of claim 10, wherein
the single SMA wire is led through the through holes for creating the dual SMA wire, or
the at least two separate SMA wires are led separately through a through hole each, wherein the ends are fitted with a stop, preferably a crimp contact, for attaching the at least two separate SMA wires, or wherein the ends are spring mounted in the through holes, preferably by means of at least one compression spring.

12. The modular actuator system of claim 1, further comprising at least one resilient element, preferably a spring, for transitioning the modular actuator system in an initial position.

13. The modular actuator system of claim 12, wherein the resilient element is configured to bias at least one rotatably mounted blade element of at least one of the first and the second type of blade elements, and/or
wherein the resilient element is configured to bias the first SMA wire, and/or
wherein the resilient element is configured to bias a linear output.

14. The modular actuator system of claim 12 or 13, wherein the at least one resilient element is configured to exert a biasing force after the system has reached an end position, preferably the system comprising an abutting element for determining the end position.

15. A rear view display device for a vehicle, preferably for a motor vehicle, comprising at least one modular actuator system of claim 1.

16. The rear view display device of claim 15, further comprising at least one of a mirror element and a camera.

17. A method of operating a modular actuator system comprising the steps of:
- rotating a first blade element of a first type of blade elements arranged to hold at least two shape memory alloy, SMA, wires and to be shaft-mounted, around a first shaft element on a first horizontal level, wherein the first blade element holds a first end section of a first SMA wire and a second end section of a second SMA wire, wherein the second end section of the first SMA wire is kept at a fixed position relative to the first shaft element;
- rotating a second blade element of the first type of blade elements, or of a second type of blade elements arranged to hold at least one SMA wire and to be shaft-mounted, around the first shaft element on a second horizontal level, wherein the second blade element is mounted on the first shaft element on a second horizontal level and holds a first end section of a third SMA wire;
- rotating the second shaft element and a third blade element of the second type blade elements, or of the first of blade elements, wherein the third blade element is non-rotatably mounted on the second shaft element, wherein the third blade element holds a second end section of the second SMA wire; and
- rotating the second shaft element and a fourth blade element of the first type or second type of blade elements, wherein the fourth blade element is non-rotatably mounted on the second shaft element on the second horizontal level and holds a second end section of the third SMA wire.

* * * * *